E. W. HOFSTATTER.
AUTOMOBILE RIM.
APPLICATION FILED SEPT. 20, 1917.
1,276,917.
Patented Aug. 27, 1918.
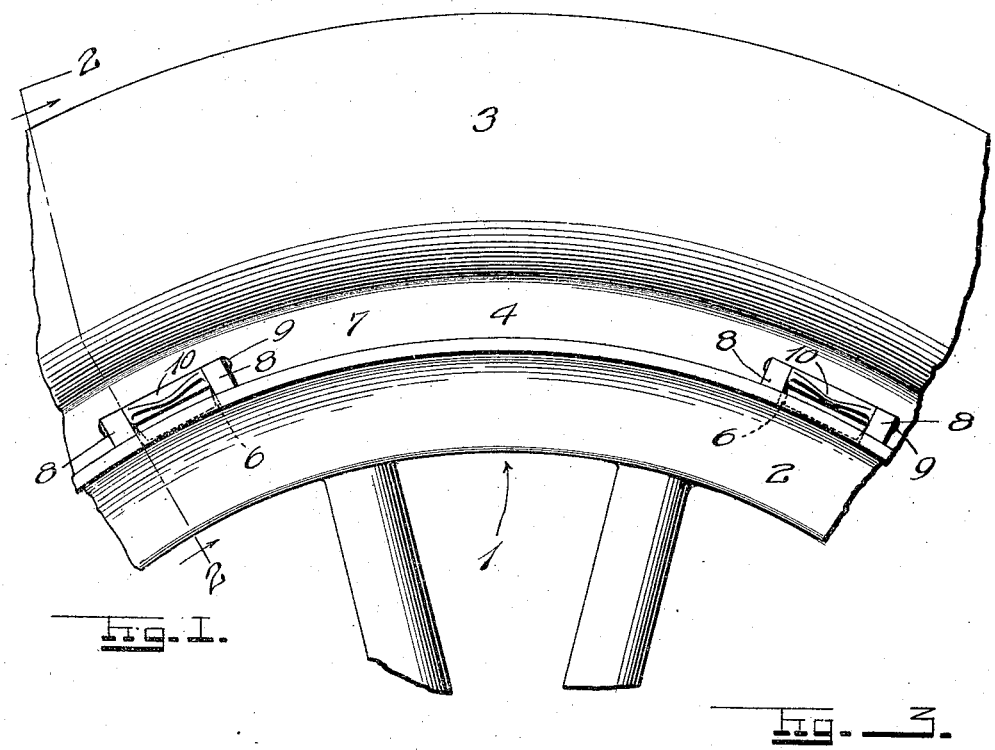
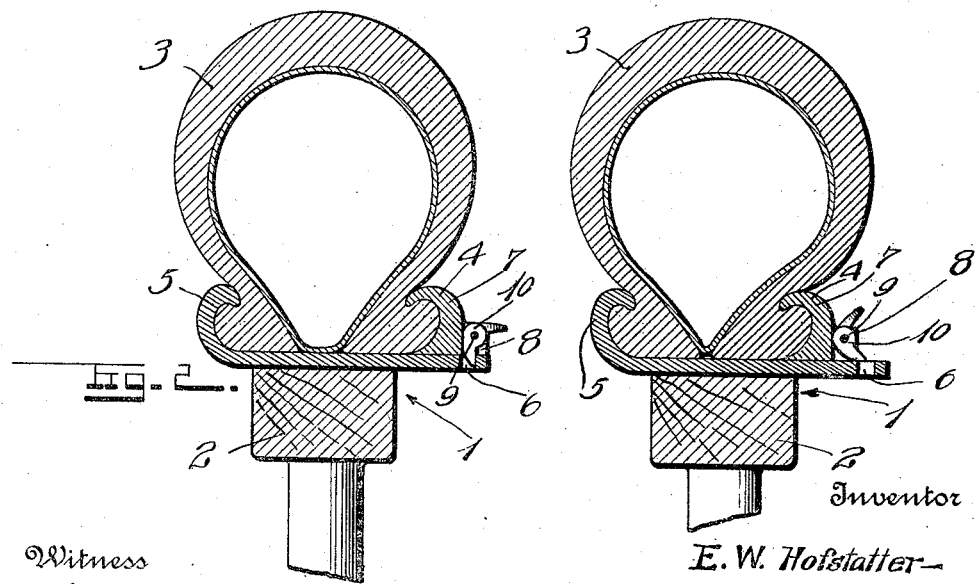
Inventor
E. W. Hofstatter
By [signature]
Attorneys
Witness
[signature]

UNITED STATES PATENT OFFICE.

ERNEST W. HOFSTATTER, OF NYACK, NEW YORK.

AUTOMOBILE-RIM.

1,276,917.     Specification of Letters Patent.     Patented Aug. 27, 1918.

Application filed September 20, 1917. Serial No. 192,360.

*To all whom it may concern:*

Be it known that I, ERNEST W. HOFSTATTER, a citizen of the United States, residing at Nyack, in the county of Rockland and State of New York, have invented certain new and useful Improvements in Automobile-Rims; and I do declare the following to be a full, clear, and exact description of the invention, such as will enable others skilled in the art to which it appertains to make and use the same.

My invention relates to improvements in automobile rims and more particularly to those having one detachable tire engaging ring, the principal object being to provide locking means for this ring which may be easily and quickly removed and applied for changing tires on the road.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of a portion of an automobile wheel and tire showing the application of the improved rim;

Fig. 2 is a vertical transverse section on the plane of the line 2—2 of Fig. 1; and Fig. 3 is a duplicate of Fig. 2 with the exception that it illustrates the locking means of the removable ring, in released position.

In the drawings above briefly described, the numeral 1 designates an automobile wheel having the usual or any preferred type of felly 2, a pneumatic tire 3 being mounted on the improved rim 4 which surrounds said felly. In case the wheel 1 is of wire construction, rather than wood, the felly 2 will be omitted as is the case with the usual well known types of the wire wheels, but the construction of the improved rim will remain the same.

The rim 4 is of equal diameter throughout its width, one edge of said rim, that is the inner edge thereof, being provided with a fixed tire engaging ring 5 which may well be formed by bending this edge outwardly as shown. The outer edge of the rim 4, however, is provided with a plurality of circumferentially extending slots or sockets 6.

A removable tire engaging ring 7 fits over the outer edge of the rim 4 and is provided at intervals with pairs of spaced outwardly extending lugs 8 which support circumferentially extending pivot pins 9, it being upon these pins that a plurality of substantially L-shaped latch members 10 are pivotally mounted at their angles, one arm of said members being adapted to swing into the sockets 6, whereas the other arms extend outwardly as shown clearly in Fig. 2, for the purpose of releasing the latches after the ring 7 has been forced inwardly to the position of Fig. 2, when the tire is deflated. After releasing said latches, it will be obvious that the ring 7 may easily be removed.

After once removing the ring 7, the tire 3 may easily be detached and repaired, after which it is again slipped on the rim, the ring 7 being now again applied and held in operative position by moving the latches 10 until they engage the slots or sockets 6 as above set forth.

From the foregoing, taken in connection with the accompanying drawings, it will be obvious that although the invention is of extremely simple and inexpensive nature, it will be highly efficient and durable for quickly changing tires with ease. Since probably the best results are obtained from the specific details of construction shown and described, such details constitute the preferred form of my device, but I wish it understood that within the scope of the invention as claimed, numerous minor changes may well be made.

I claim:

A vehicle rim straight throughout its width in transverse section and having on one edge an integral bead engaging ring, the other edge of said rim having a plurality of circumferentially spaced circumferentially extending slots, a removable bead engaging ring surrounding said last named edge of the rim and spaced inwardly from said slots, pairs of lateral ears on and integral with said removable ring and located at the ends of said slots, and a plurality of L-shaped latches between said ears and pivoted thereto, one end of said latches extending into said slots to prevent outward movement of said removable ring and circumferential creeping of the latter, and the other ends of said latches forming operating means therefor.

In testimony whereof I have hereunto set my hand in the presence of two subscribing witnesses.

ERNEST W. HOFSTATTER.

Witnesses:
FREDERICK G. GRIMME,
JANE AUNGANSEN.